UNITED STATES PATENT OFFICE.

ERNEST NIENSTAEDT, OF NEW YORK, N. Y., ASSIGNOR OF ONE-HALF TO LEO GOLDMARK, OF SAME PLACE.

PROCESS OF WINNING METALS FROM MAGNETIC IRON SAND, METALLIC ORE-DUST, AND METALLIC RESIDUES.

SPECIFICATION forming part of Letters Patent No. 520,377, dated May 22, 1894.

Application filed June 23, 1893. Serial No. 478,627. (No specimens.)

*To all whom it may concern:*

Be it known that I, ERNEST NIENSTAEDT, a citizen of the United States, and a resident of New York, in the county and State of New York, have invented a new and useful Process of Winning Metals from Magnetic Iron Sand, Metallic Ore-Dust, and Metallic Residues, of which the following is a specification.

Many attempts have been made to win the metals from magnetic iron sand, metallic ore-dust and metallic residues by the common process applied in the treatment of metallic ores in the blast furnaces, but no success has been obtained up to this time, as almost all metal-containing particles were blown through the chimneys.

My improved process of winning the metals from magnetic iron sand, as well as from metallic ore-dust and metallic residues does away with this disadvantage and enables me to extract all metals from the said materials in a very simple and reliable manner. It is evident that my process is of the greatest importance, as thereby the ore-dust and metallic residues, which at present are of almost no value, will be rendered very useful, and the extensive fields of magnetic iron-sand found all over the United States and in other countries can be converted into valuable and paying districts.

In carrying my invention into effect, I mix the magnetic iron sand, metallic ore-dust, or any metallic residues with a certain quantity of pulverized calcined magnesite. If preferred, the iron particles of the magnetic iron sand may be separated from the sand before mixing the same, as described, by means of suitable separators. The quantity of calcined magnesite depends on the chemical conditions of the metallic particles or ores. If for example the iron particles separated from the sand are used, I take to one hundred pounds of iron-particles about four to five pounds of pulverized calcined magnesite. Then chloride of magnesium is dissolved in water to obtain a solution which contains thirty to eighty per cent. of the chloride of magnesium, according to the physical conditions of the iron sand, ore-dust, or metallic residues, and about five per cent. glutinous binding material as starch, dextrine, glue, or flour are added thereto and thoroughly mingled therewith, so that the solution becomes somewhat pasty, but these binding materials may also be omitted, as they are not absolutely necessary. If starch or glue is used, the solution is heated to the boiling point and then cooled. The solution is then added to the mixture of the iron-sand, separated iron-particles, or metallic residues with the pulverized calcined magnesite and intimately mixed therewith by agitation, so that the said materials become moist and somewhat glutinous. The mass thus obtained is finally formed into bricks by any suitable contrivances, which bricks, when hardened, are of a firm consistency and can be handled in the same manner as pieces of ore. It is evident that bricks of any form and shape can be made with the said ingredients for example hollow bricks which have the advantage that the draft in the furnace has a better play than with full bricks. The bricks are placed into a blast furnace and there treated with the necessary flux and reducing materials to promote the fusion of the metals, as sand, lime, coke, coal-dust, and the metals are extracted from the bricks by the well known blast furnace process.

I am aware that ore bricks were made heretofore, and I do not claim such bricks broadly.

What I claim is—

The process of winning metals from magnetic iron-sand, or from the magnetic particles separated therefrom, or from metallic ore-dust or any metallic residues, which consists in mixing the said materials with calcined magnesite, water, chloride of magnesium, and a glutinous binding material, forming from the mass thus obtained bricks and treating the latter in blast furnaces like metallic ores in the common manner with flux and reducing materials, as sand, lime, coal-dust, coke, substantially as set forth.

Signed at New York, in the county and State of New York, the 19th day of June, 1893.

ERNEST NIENSTAEDT.

Witnesses:
CHARLES KARP,
ARTHUR BLUMENTHAL.